Dec. 18, 1962 J. S. ALFORD 3,068,645
AERODYNAMIC NOZZLE
Filed July 11, 1955
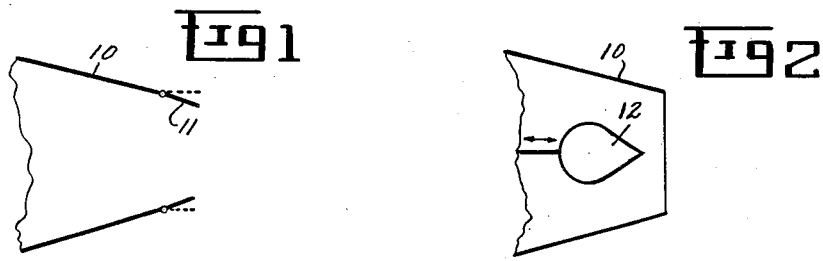
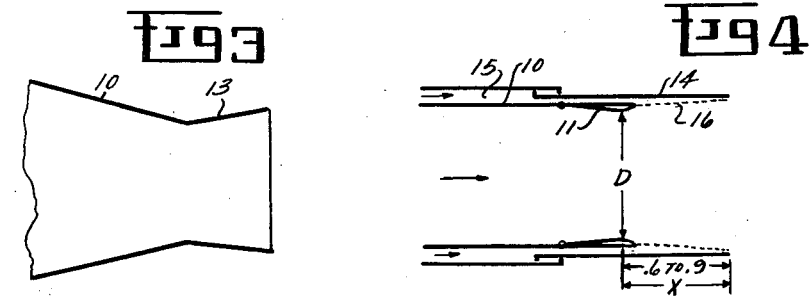
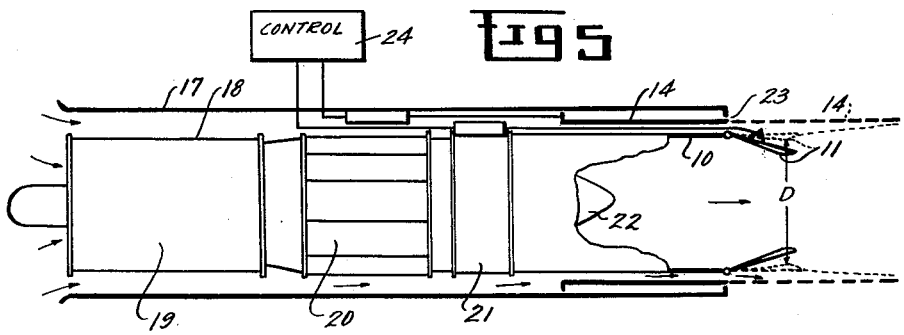
INVENTOR.
JOSEPH S. ALFORD
BY
Edward M. Tittle
HIS ATTORNEY United States Patent Office 3,068,645
Patented Dec. 18, 1962

3,068,645
AERODYNAMIC NOZZLE
Joseph Sonage Alford, Cincinnati, Ohio, assignor to General Electric Company, a corporation of New York
Filed July 11, 1955, Ser. No. 520,954
6 Claims. (Cl. 60—35.6)

This invention relates to an aerodynamic nozzle and, more particularly, to an aerodynamic nozzle as may be employed in a reaction power plant such as used in a jet plane. While the present invention was designed primarily for use with jet engines, the structure herein disclosed may have utility in other uses wherein the pressure ratios across the nozzle are such that a range from subsonic to supersonic flow of the fluid therethrough is desired.

It is well known that the thrust of a jet engine or reaction-type power plant is directly proportional to the increase in velocity of the fluid from the entrance of the engine to the exit plane of the nozzle. It is of utmost importance, therefore, that the maximum velocity increase be obtained in the nozzle. Fundamental thermodynamics prove that this increase in velocity results from passing the fluid through a converging passage until sonic velocity is obtained. To increase gas velocity beyond sonic, the nozzle downstream of the sonic velocity plane must increase in area and for nozzle pressure ratios greater than the ratio for sonic velocity (called the critical ratio), a nozzle passage that at first converges to a minimum throat area and then diverges from the throat to the exit plane is required. As the pressure ratio across the nozzle increases, the divergent requirement for optimum thrust increases.

In normal subsonic operation of jet planes, a converging-type nozzle has been used. Since the pressure ratio across the nozzle is seldom greater than 4, such a nozzle is satisfactory for subsonic conditions. The nozzle, under these conditions, can be made to operate very efficiently. However, with the advent of higher speed jet planes, it becomes necessary to increase the velocity of fluid through the nozzle to supersonic velocity. As a result, the pressure ratio range across the nozzle varies from a low figure to a high figure; for example, from 2:1 to 15:1 or higher. If the engine operated at a single nozzle pressure ratio, it would be a simple matter to provide a nozzle having a fixed exit geometry tailored to fit this operating condition. Since this is not the case in the normal fighter-type airplane wherein the nozzle must operate efficiently at cruising or subsonic speed, and also at emergency or high supersonic speed, the nozzle must be so designed as to operate efficiently at both low and high pressure ratios. Unfortunately, the converging nozzle is inefficient in operation at supersonic velocities. Conversely, the converging-diverging nozzle is inefficient at low pressure ratios or at subsonic velocities. Normally, it was thought necessary to provide a mechanical boundary for the controlled expansion in the divergent portion of a converging-diverging nozzle. Recently, it has been discovered that an air wall may be used to control this expansion and a nozzle so operating may be termed an aerodynamic nozzle. Such a nozzle provides good thrust characteristics over a broad range of pressure ratios.

Accordingly, it is a primary object of the present invention to provide an aerodynamic nozzle in combination with a reaction-type power plant.

Another object is to provide an aerodynamic convergent-divergent nozzle for use with a reaction-type power plant, the nozzle being structurally simple and providing efficient operation at both subsonic and supersonic fluid velocities.

A further object is to provide an aerodynamic convergent-divergent nozzle which operates efficiently as an ordinary convergent nozzle for subsonic fluid velocities, and also operates efficiently as a convergent-divergent nozzle to provide controlled expansion at supersonic fluid velocities.

Briefly stated, in one embodiment of my invention I provide for use in a reaction type power plant an aerodynamic convergent-divergent nozzle having an inner convergent portion defining the nozzle throat, an outer member surrounding the inner member and creating a passage therebetween, the outer member extending downstream of the throat, an air intake connected to the passage and providing a source of air of sufficient pressure to form a wall confined by the outer member and forming the divergent portion of the nozzle during supersonic operation of the power plant.

My invention will be better understood from the following description taken in connection with the accompanying drawing and its scope will be pointed out in the appended claims.

In the drawing:
FIGURE 1 is a partial schematic showing of a variable area converging nozzle;
FIGURE 2 is a partial schematic showing similar to FIGURE 1, but showing a different means for varying the throat area of the nozzle;
FIGURE 3 is a schematic showing of a converging-diverging nozzle;
FIGURE 4 is a partial schematic showing of a converging-diverging nozzle of the present invention during supersonic operation; and
FIGURE 5 is a schematic showing, partly broken away, of the converging-diverging nozzle of the present invention, during subsonic operation, applied to a nacelle or fuselage structure of an aircraft and showing the shroud and variable members as they would be positioned for supersonic operation in dotted lines.

Referring first to FIGURE 1, there is shown a converging nozzle of a type sometimes employed in jet planes designed to travel at subsonic speeds. The nozzle, of course, is located at the rear end of the fuselage of the plane or in the nacelle as part of the engine structure. The nozzle consists of a tailpiece 10 and may have suitable means for varying the cross-sectional area at the nozzle throat such as pivoted flaps or members 11. These flaps permit the throat area of the nozzle to be varied to thus increase the velocity of the fluid through the throat area and, consequently, the thrust from the nozzle. Tailpiece 10 may converge in conjunction with members 11 as shown, or be substantially straight and members 11 alone be used to form the converging part of the nozzle. In the configuration shown, the cross-sectional area is varied by pivoting members 11 toward the longitudinal axis of the nozzle. Such a configuration is shown in U.S. Patent 2,634,578 to G. W. Kallal. In FIGURE 2, I have shown a modification for the same purpose namely, to vary the cross-sectional area at the throat of the converging nozzle. Movement of plug 12 axially of the nozzle will increase or decrease the cross-sectional area at the throat as a result of the plugs moving away from the throat or toward the throat respectively. Such a modification is illustrated in U.S. Patent 2,510,506 to T. I. Lindhagen et al.

The above two nozzles, with means for varying the cross-sectional area of the nozzle, are intended for use at subsonic velocities of the fluid flowing therethrough. At such subsonic fluid velocity, the nozzle may operate efficiently. However, at supersonic velocity flow the efficiency of the nozzle decreases rapidly, once flow above sonic velocity is encountered.

Under such conditions, a converging-diverging type nozzle, as illustrated in FIGURE 3, is resorted to. The tailpiece 10 has a diverging extension 13 secured thereto to provide a converging-diverging nozzle. In such nozzles controlled expansion of the gases or fluids leaving the converging tailpiece 10 is obtained by making extension 13 a mechanical boundary that may be made flexible to change the cross-sectional area provided by extension 13. Such a configuration is shown in FIGURE 10 of U.S. Patent 2,658,333 to A. J. Smialowski. This patent illustrates a means for providing a mechanical boundary in a converging-diverging type nozzle.

In order to cool the tailpiece, which is subjected to high exhaust temperatures, it is known to provide a boundary layer of cooling air flowing outside the tailpiece. Such a construction is shown in U.S. Patent 2,639,578 to W. D. Pouchot.

When reheat operation is encountered, the exhaust temperatures and the volume of gases to be expelled increases over that of the normal cruising operation at subsonic speed. Reheat consists in introducing extra fuel in the tailpiece beyond the turbine to provide for more expansion of the hot gases and, consequently more thrust from the nozzle. Also, under reheat conditions the pressure ratio of the nozzle increases very rapidly. As the pressure ratio across the nozzle increases, the divergent requirements for the diverging part of the nozzle increase also if nozzle efficiency is to be maintained and consequently maximum thrust is to be obtained.

In some reaction-type power plants designed for sustained supersonic velocity, the equivalent of reheat operation is the standard operating condition. Since supersonic velocity is rapidly attained and maintained, inefficient operation during the relatively short period of time in passing through the subsonic range may be tolerated.

In FIGURE 4, there is shown an embodiment of the aerodynamic nozzle of the present invention as applied to a reaction-type power plant for a jet plane for operation at both subsonic and supersonic velocities. In the nozzle shown, tailpiece 10 is conventional and may be supplied with pivoted members 11 as shown in FIGURE 1, or a plug may be used as plug 12 in FIGURE 2. As previously stated, the purpose of members 11 or plug 12 is to vary the throat area of the nozzle formed by tailpiece 10. In combination with this nozzle, applicant provides a shroud spaced annularly from tailpiece 10 which shroud 14 is preferably movable axially of the nozzle as will hereinafter be described. The shroud 14 is a telescopic tubular member and preferably, although not necessarily, cylindrical. The primary air flow through such a nozzle takes place within tailpiece 10 as shown by the arrow. Reheat operation is performed by injecting fuel into this area for further burning and expansion. A secondary air flow, which may be by ram air or by the means shown in the aforementioned Pouchot patent, is passed through annular passage 15 to exit around the tailpiece 10. As can be seen from FIGURE 4, shroud 14 is annularly spaced from tailpiece 10 to provide passage 15. When shroud 14 is extended beyond the end of tailpiece 10 in the position shown in FIGURE 4, the secondary air through passage 15 provides an air boundary wall 16 that extends approximately to the end of shroud 14. This is what the inventor has termed an "aerodynamic" convergent-divergent nozzle, namely, one wherein secondary air of sufficient pressure provides a confining wall in the divergent portion of the nozzle for the fluid exiting from tailpiece 10. As shown in FIGURE 4, pivoted members 11 are fully open to provide a maximum cross-sectional throat area in the convergent-divergent nozzle. However, if desired, they may be placed in any intermediate position. The configuration shown in FIGURE 4 provides for efficient nozzle operation for fluid flow at supersonic velocities, and gives a controlled expansion of the fluid issuing from the nozzle of tailpiece 10, when shroud 14 is extended beyond the throat area, a distance X which preferably for most efficient operation is from six to nine-tenths of D where D is the diameter of the tailpiece at the throat area as seen in FIGURE 4. In other words, the shroud 14 extends beyond the plane of the throat of the convergent-divergent nozzle, a distance of six-tenths to nine-tenths of the diameter of the throat for most efficient operation.

The illustration just described with reference to shroud 14, while satisfactory at supersonic fluid velocities which occur at high nozzle pressure ratios, operates at reduced efficiency at the low cruising speeds involving subsonic fluid velocities because of the shock losses due to overexpansion, and also because of the increased drag caused by the larger cross-sectional area formed by the extended shroud 14. This condition is acceptable as mentioned above in certain reaction-type power plants where sustained supersonic velocities are normal and the transition period through the subsonic range is relatively short. However, in such a power plant for use in jet planes where subsonic velocity may comprise most of the operating time of the power plant, it is desirable that the subsonic operation should be efficient. Thus, at cruising speeds and subsonic fluid velocities, it is necessary that the effect of the extended shroud 14 be obviated. In accordance with the present invention, this is obtained by making shroud 14 axially slidable for such application so that it may be retracted toward the nozzle formed by tailpiece 10, to have no effect at cruising speeds.

In FIGURE 5, I have schematically shown a nozzle of the present invention as applied to a nacelle or a fuselage of an air-borne craft such as an airplane. Member 17 may be considered the nacelle or fuselage, as the case may be, of the craft and it is radially spaced from inner wall 18 which is the confining member for the engine comprising, as schematically shown, a compressor 19, combustors 20, turbine 21, and fairing cone 22. Shroud 14 is designed to extend downstream of the end of tailpiece 10 to provide a controlled expansion by a secondary air wall in the diverging portion of the nozzle for operation at high pressure ratios encountered at supersonic fluid velocities. The secondary air also acts as a cooling medium for the shroud. In addition, shroud 14 may be retracted when used on a jet plane by sliding it axially along the longitudinal axis of the nozzle until it assumes the position where the downstream end of shroud 14 falls preferably no farther downstream than point 23 as shown in FIGURE 5 which is the plane of convergency of the nozzle. In this retracted position, the shroud is rendered inoperable to affect the operation of the normal converging variable area nozzle as formed by tailpiece 10 and members 11. When the shroud is extended downstream of the plane of the throat a distance of from six-tenths to nine-tenths the diameter at the throat area of the converging part of the nozzle, it provides efficient aerodynamically controlled expansion of the fluid flow from the nozzle throat area to adjacent the end of the extended shroud member 14.

It is to be noted that in the application to a jet plane the operation of shroud 14 and the pivoted members 11 or plug 12 may be independent of one another or may be tied together for cooperative operation through a suitable mechanism, such as a control member 24, shown diagrammatically in FIGURE 5, with connections to shroud member 14 and pivoted members 11. Control member 24 is normally responsive to different parameters in order to initiate proper actuation of shroud 14 and members 11, or plug 12, independently of one another or in conjunction with one another. Normally, the operation of members 11, or plug 12, is determined as a function of the thrust desired from the nozzle. Shroud 14 is intended to operate as a function of the pressure ratio from nozzle entrance to the atmosphere into which the nozzle discharges. In the present instance, wherein it is used to provide controlled expansion for supersonic fluid velocities, it can be seen that shroud member 14 operates in the extended position only at high supersonic fluid velocities and is rendered inoperative in the retracted position at subsonic fluid velocities. This corresponds to cruising speed if used on a jet plane.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

I claim:

1. In a reaction-type power plant, a convergent-divergent aerodynamic nozzle including: an inner convergent nozzle defining the throat portion of the convergent-divergent aerodynamic nozzle; an outer tubular member surrounding said inner convergent nozzle, said tubular member extending downstream of the inner convergent nozzle; a secondary air passage between said inner convergent nozzle and said outer tubular member; an air intake connected to said passage and providing a source of air of sufficient pressure to form a wall of secondary air confined by the tubular member, said secondary air wall being the divergent portion of the aerodynamic nozzle during supersonic operation thereof.

2. In a reaction-type power plant a convergent-divergent aerodynamic nozzle including: an inner convergent nozzle defining the throat of the convergent-divergent aerodynamic nozzle; an outer tubular member spaced from and surrounding said inner convergent nozzle to define a secondary air passage therebetween, said tubular member extending downstream of the throat at least six-tenths of the diameter of said throat; a source of air connected to the secondary air passage upstream of said tubular member to provide air of sufficient pressure to form a secondary air wall confined by the tubular member, said air wall being the divergent portion of the aerodynamic nozzle during supersonic operation thereof.

3. In a reaction-type power plant a convergent-divergent aerodynamic nozzle including: an inner variable area convergent nozzle which defines the throat area of the aerodynamic nozzle; an outer annular shroud spaced from and surrounding said inner variable area convergent nozzle to define a secondary air passage therebetween, said shroud extending downstream of the throat area of said inner nozzle at least six-tenths of the diameter of the throat area; a source of air connected to the secondary air passage upstream of the shroud and providing air of sufficient pressure to create a secondary air wall confined by said shroud, said air wall forming the divergent portion of the convergent-divergent aerodynamic nozzle during supersonic operation thereof.

4. In a reaction-type power plant, a convergent-divergent aerodynamic nozzle including: an inner convergent nozzle which defines the throat portion of the convergent-divergent aerodynamic nozzle; an outer tubular member surrounding said inner convergent nozzle, said tubular member being operable between a first, extended position downstream of the throat of said inner nozzle during supersonic operation of the power plant and a second, retracted position upstream of said throat during subsonic operation of said power plant; a secondary air passage between said inner convergent nozzle and said outer tubular member; an air intake connected to said passage and providing a source of air of sufficient pressure to form a wall of secondary air confined by the tubular member in the extended downstream position thereof, said secondary air wall being the divergent portion of the convergent-divergent aerodynamic nozzle.

5. In a reaction-type power plant, a convergent-divergent aerodynamic nozzle comprising: an inner variable area convergent nozzle which defines the throat portion of the aerodynamic nozzle, said inner nozzle including flap means at the downstream end thereof to vary the cross sectional area of said throat portion; a continuous shroud surrounding said inner nozzle and spaced therefrom to define a secondary air passage therebetween, said shroud being movable axially of said inner convergent nozzle to extend downstream of said variable area throat portion a distance of six to nine-tenths of the minimum diameter of the throat portion; an air intake connected to the secondary air passage upstream of the variable area throat portion and providing air of sufficient pressure to form a wall of secondary air confined by the shroud in the extended position, said air wall being the divergent portion of the convergent-divergent aerodynamic nozzle during supersonic operation thereof.

6. The combination of a reaction-type power plant and an aerodynamic convergent-divergent jet nozzle, said aerodynamic nozzle including an inner convergent nozzle for the discharge of motive fluid, said inner nozzle defining a throat; retractable annular means spaced about the inner nozzle to define a secondary air passage therebetween, said annular means being extendable to a position downstream of said throat for supersonic operation of the power plant; an air intake in series with said air passage upstream of the annular means and the throat, said intake providing air of sufficient pressure to create a wall of secondary air, said air wall forming the divergent portion of the convergent-divergent aerodynamic nozzle when the annular means is in the extended position to confine the motive fluid discharged from the inner nozzle.

References Cited in the file of this patent

UNITED STATES PATENTS

| | | |
|---|---|---|
| 2,570,629 | Anxionnaz et al. | Oct. 9, 1951 |
| 2,658,333 | Simalowski | Nov. 10, 1953 |
| 2,744,381 | Geisel | May 8, 1956 |
| 2,796,731 | Morley et al. | June 25, 1957 |
| 2,813,395 | Meyer | Nov. 19, 1957 |
| 2,840,984 | Laucher | July 1, 1958 |
| 2,870,600 | Brown | Jan. 27, 1959 |

FOREIGN PATENTS

| | | |
|---|---|---|
| 998,358 | France | Sept. 19, 1951 |